United States Patent
Nishiyama et al.

Patent Number: 5,148,289
Date of Patent: Sep. 15, 1992

[54] IMAGE FORMING APPARATUS

[75] Inventors: Masaaki Nishiyama, Toyohashi; Shigeo Ogino, Toyokawa, both of Japan

[73] Assignee: Minolta Camera Kabushiki Kaisha, Osaka, Japan

[21] Appl. No.: 553,384

[22] Filed: Jul. 17, 1990

[30] Foreign Application Priority Data

Jul. 17, 1989 [JP] Japan .................................. 1-185265

[51] Int. Cl.⁵ ...................... H04N 1/29; G03B 15/01
[52] U.S. Cl. ..................................... 358/300; 358/80; 358/298; 346/157; 346/160; 355/246; 355/326
[58] Field of Search ............... 358/300, 80, 461, 298, 358/458; 346/157, 160; 355/246, 326

[56] References Cited
U.S. PATENT DOCUMENTS

| | | | |
|---|---|---|---|
| 4,675,696 | 6/1987 | Suzuki | 358/75 |
| 4,839,722 | 6/1989 | Barry | 358/80 |
| 4,894,685 | 1/1990 | Shoji | 355/246 |
| 4,929,978 | 5/1990 | Kanamori | 358/80 |

Primary Examiner—Benjamin R. Fuller
Assistant Examiner—Scott A. Rogers
Attorney, Agent, or Firm—Burns, Doane, Swecker & Mathis

[57] ABSTRACT

There is disclosed an image forming apparatus having a function for correcting the gradation characteristic of an image formed so as to be linear to the gradation degree.

The image forming apparatus has a correction circuit for correcting inputted graduatin data to gradation data having a number of gradation degrees larger than that of the inputted gradation data to represent gradation data of a document image more precisely, for example in a range of low gradation.

There is also disclosed a test mode for detecting an actual γ-characteristic of the image forming apparatus by measuring toner densities of test images formed on a recording medium beforehand.

17 Claims, 8 Drawing Sheets

IMAGE FORMING APPARATUS

BACKGROUND OF THE INVENTION

1. Field of the Invention

The present invention relates to an image forming apparatus such as a digital-color copy machine and a method therefor.

2. Description of Related Art

A digital color copy machine is comprised of an image reader for reading a document by a color image reader for reading a document data and a printer which converts gradation data to binary print image signals by binarizing them and prints an image on a copy paper responsive to the print image signals using an electrophotographic method. In the digital color copy machine, the image reading action is performed repeatedly in order to obtain a color copy and the printing action is repeated to a copy paper in every color.

Figure 7A:
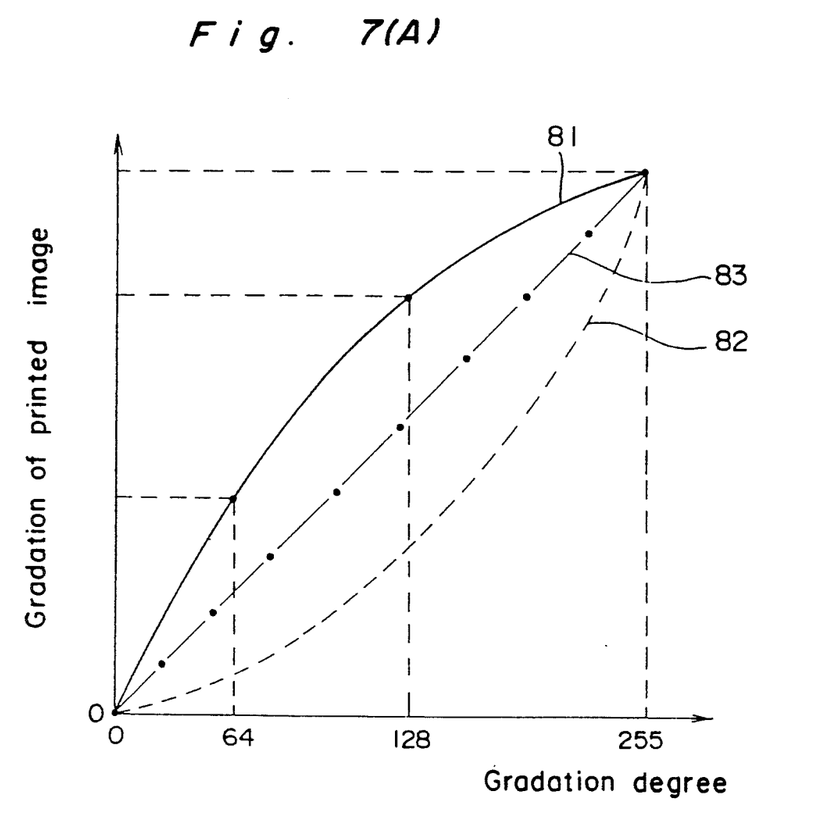
FIGS. 7(A) and 7(B) are graphs showing a γ-characteristic and a correction characteristic for correcting the γ-characteristic, respectively.

In the printer, a laser diode is driven by print image signals amplified and an image is formed by scanning a laser beam emitted from the laser diode on a photoconductive drum. In a copy machine forming an image using the electrophotographic method, a characteristic of the gradation of an image printed on a copy paper to gradation data of image signals (hereinafter referred to as γ-characteristic) is not linear, as indicated by a reference numeral 81 in FIG. 7(A). In order to obtain a linear gradation characteristic 83 of the printed image, it is necessary to provide a γ-correction circuit for correcting gradation data of a document image using a correction characteristic 82 reversed from the γ-characteristic 81. However, in the conventional copy machine, gradation data as input data to the γ-correction circuit has a bit number same to that of corrected gradation data outputted therefrom. As apparent from FIG. 7(A), the gradient of the correction characteristic 82 in a range of low gradation is smaller than that in a range of higher gradation. Due to this, an error becomes large between the gradation of the correction characteristic 82 and that of digital gradation data having been corrected, especially in a low gradation range and, thereby, it becomes impossible to reproduce a document image faithfully.

Further, in the conventional copy machine, the γ-correction circuit has only one correction characteristic 82 and, when the γ-characteristic of the copy machine is varied by a change in the environment of use such as temperature, humidity and the like the gradation characteristic of a printed image becomes non-linear and this makes it impossible to form an image faithfully.

SUMMARY OF THE INVENTION

One object of the present invention is to provide an image forming apparatus a method therefor being capable of reducing an error between gradation data of image signals inputted and gradation data corrected using correction data and, thereby, capable of forming a document image faithfully.

Another object of the present invention is to provide an image forming apparatus a method therefor being capable of maintaining an output characteristic of gradation linear even if the environment of use, for example temperature and/or humidity, is varied.

In order to accomplish these objects, according to the present invention, there is provided an image forming apparatus for forming an image on a recording medium by projecting a laser beam thereon including the following; a reader means for reading a document image and outputting first image data, said first image data being digital data each of which is comprised of bits of a first number and representing the density of said document image with a plurality of gradations, a correction means for correcting a gradation characteristic of said first image data and outputting second image data, said second image data being digital data each of which is comprised of bits of a second number and representing the density of said document image with a plurality of gradations and said second number being larger than said first number, a digital to analog conversion means for converting said second image data to analog data and outputting them as third image data, and a driving means for supplying an ergizing electric current to a laser emitting means responsive to said third image data.

According to this image forming apparatus, the bit number of the gradation degrees of image data inputted is increased to the second bit number upon correcting the gradation data and, thereby, the number of the gradation degrees in a range of low gradation is substantially increased. Thus, images having low gradations are reproduced faithfully.

According to another aspect of the present invention, the memory means has a plurality of correction tables corresponding to various image densities, respectively. Therefore, it becomes possible to correct gradation data inputted using one correction table suitable for the density of a document image to be reproduced.

According to a further aspect of the present invention, there is provided a data supply means for supplying plural test data having gradations different from each other to said correction means.

Using plural test data, the gradation characteristic of the copy machine is estimated beforehand and the correction of the gradation data inputted is performed based upon the estimated gradation characteristic. Thus, it becomes possible to compensate variations of the environment of use.

BRIEF DESCRIPTION OF THE DRAWINGS

These and other objects and features of the present invention will become clear from the following description taken in conjunction with the preferred embodiment thereof with, reference to the accompanying drawings, in which.

DETAILED DESCRIPTION OF THE PREFERRED EMBODIMENT

[I] Composition of Digital color copy machine

The digital color copy machine according to the present invention is comprised of an image reading section 100 for reading a document using a CCD color image sensor 14 and converting image signals to gradation data and a printer section 200 for driving a laser diode LD responsive to print driving signals obtained by converting said gradation data and printing an image on a copy paper using an electrophotographic method.

Figure 1:
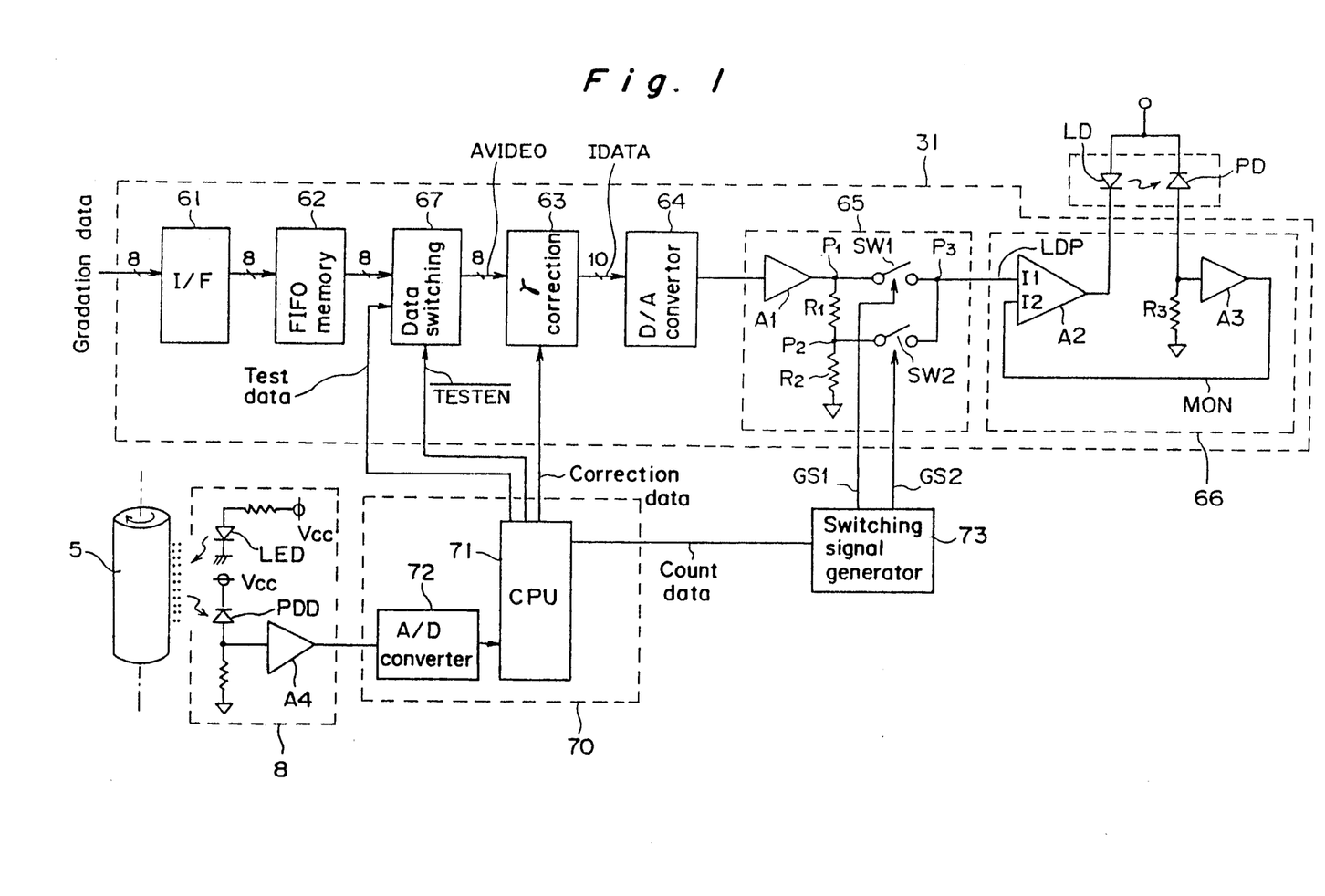
FIG. 1 is a block diagram for showing an image signal processing section, a control section and a detection device for detecting toner density of a digital color copy machine according to the present invention.

In this preferred embodiment of the present invention, as shown in FIG. 1, there are provided a γ-correction circuit 63 for correcting gradation data inputted in order to make a gradation characteristic of an image outputted linear, a control circuit 70 for forming three test images having predetermined gradation degrees in order to estimate a γ-characteristic of an image to be outputted based on densities of test images and correcting the gradation data based upon the γ-characteristic estimated and a detection means 8 for detecting the toner density.

The bit number of each gradation data IDATA outputted from the γ-correction circuit 63 is set at ten while the bit number of each inputted gradation data AVIDEO is set at eight.

In the digital color copy machine, the reading of the document by the image reader section 100 is done in every color repeated in the multi-color copy mode and the printing of the image by the printer section 200 is done repeatedly to one copy paper.

Figure 2:
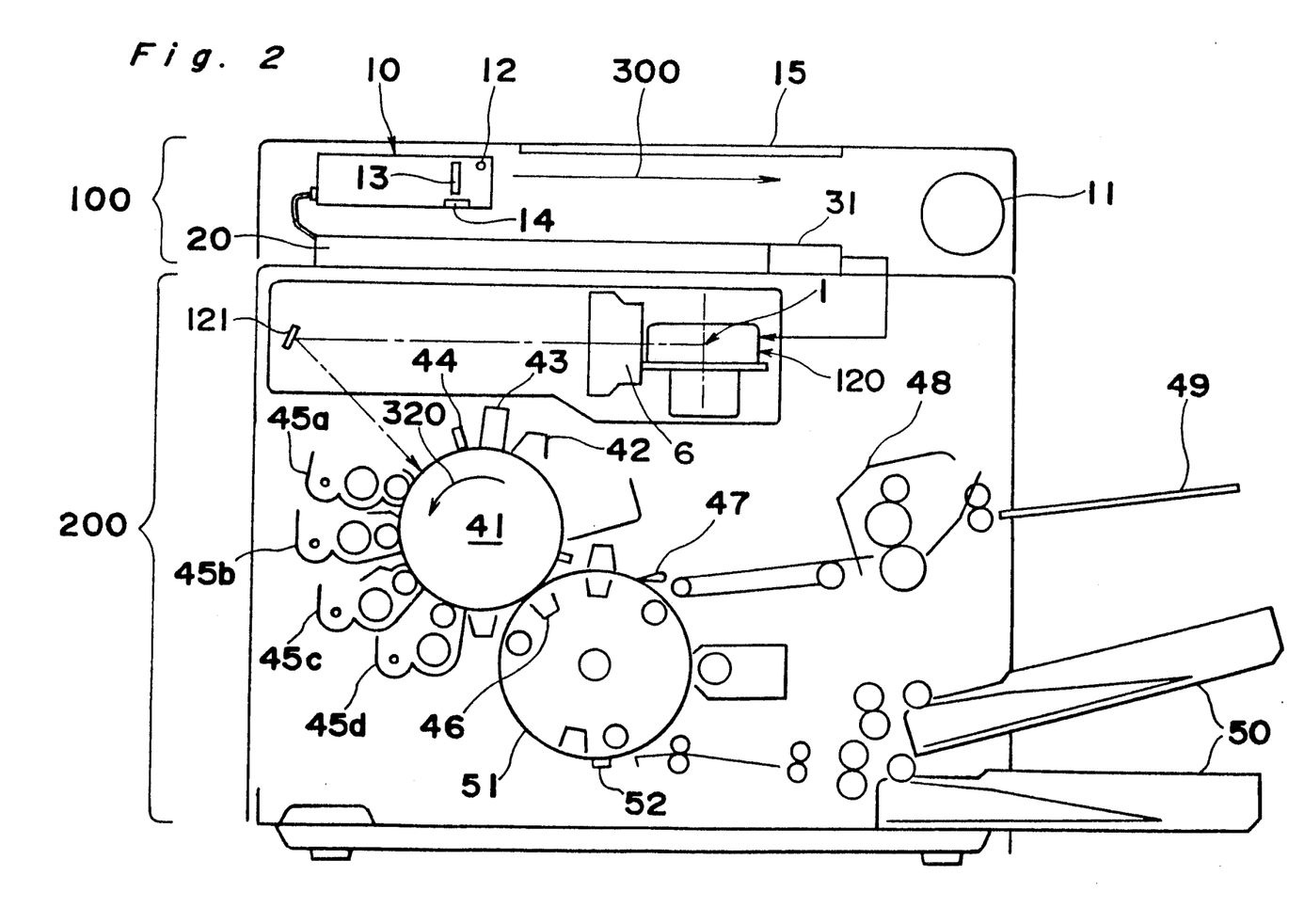
FIG. 2 is a schematic cross-sectional view of the digital color copy machine according to the present invention.
Figure 3:
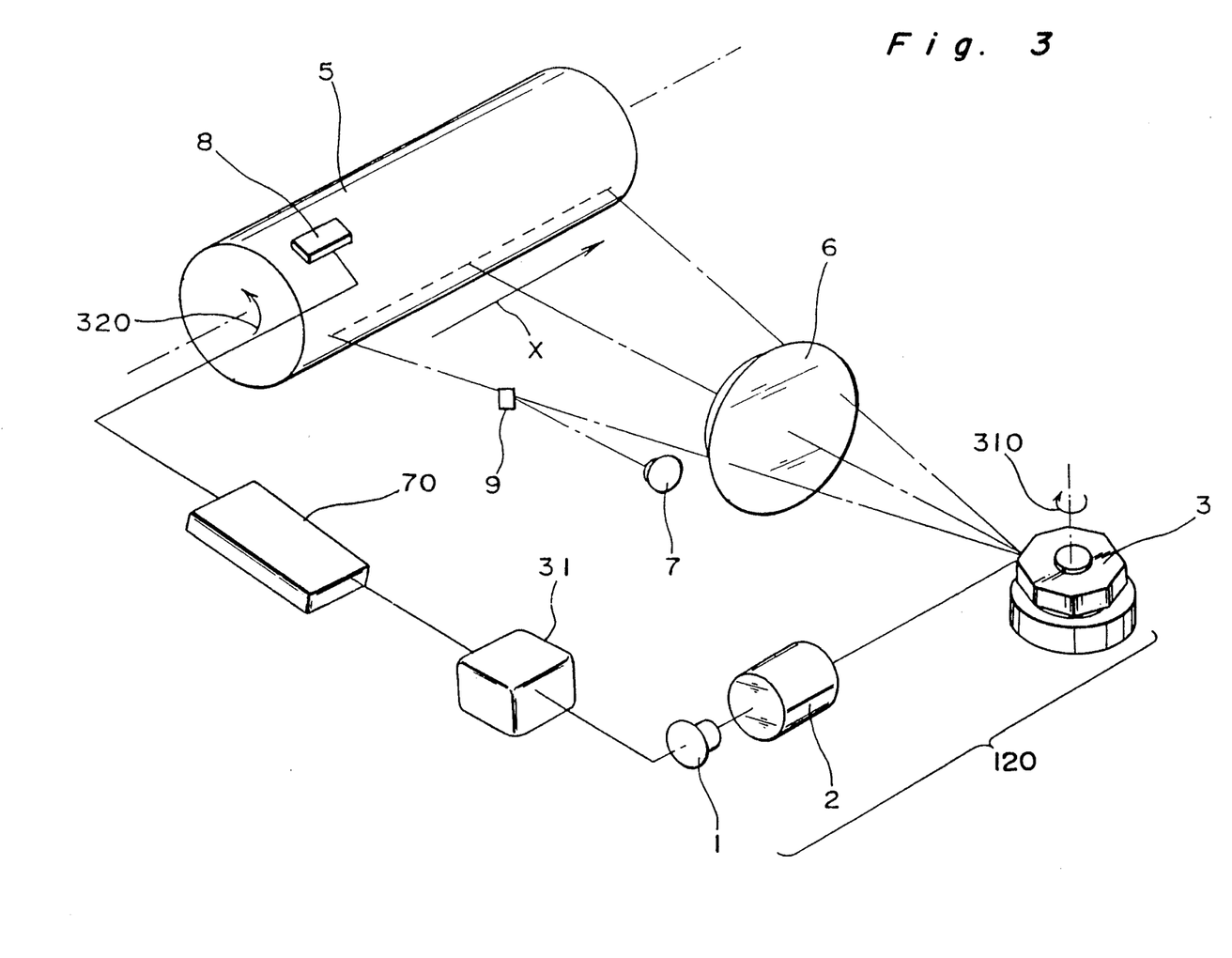
FIG. 3 is a perspective view showing an optical system of the digital color copy machine according to the present invention.

FIG. 2 is a schematic sectional view of the digital color copy machine according to the present invention and FIG. 3 is a perspective view of a laser beam scanning system 120 for forming a latent image on a photoconductive drum.

In FIG. 2, a scanner 10 provides an exposure lamp 12 for illuminating a document, a rod-lens array 13 for collecting lights reflected from the document and a CCD color image sensor 14 of contact type for converting collected lights to electric signals. The scanner 10 is driven by a motor 11 upon reading a document set on a platen 15 and is moved in a direction (sub-scan direction) indicated by an arrow 300. The image of the document illuminated by the exposure lamp 12 is converted photoelectrically by the image sensor 14. Multi-valued electric signals of three colors R(red), G(green) and B(blue) obtained by the image sensor 14 are converted to gradation data with respect to four colors yellow(Y), magenta(M), cyan(C) and black(K) by the image reading section 20. Next, the print head 31 performs the γ-correction to the gradation data input according to properties of each toner to be used and, thereafter, generates driving signals for the laser diode LD by converting corrected image data to digital gradation data to drive the laser diode LD in a semiconductor laser 1.

As shown in FIG. 3, a laser beam emitted from the laser diode LD in the semiconductor laser 1 in response to the gradation data is projected and collected by a collimating lens 2, on one deflection plane of a polygon mirror 3. The laser beam collected on the deflection plane is deflected according to a rotation of the polygon mirror 3 in a direction as indicated by an arrow 310, namely scanned in a main scan direction as indicated by an arrow X and, via an fθ lens 6, projected on the photoconductive drum 5 being driven to rotate in a direction as indicated by an arrow 320 to exposure the same it. Due to this scan, a document image is formed on the photoconductive drum 5. It is to be noted that a reflection mirror 121 shown in FIG. 2 is omitted in FIG. 3.

Upon a start of scan in the main scan direction, the laser beam is reflected by a reflection mirror 9 and inputted into a detection device 7 for detecting a start of scan signal (hereinafter referred to as SOS signal). The detection device 7 outputs an SOS signal responsive to the laser beam inputted which is a synchronizing signal for indicating a start of one line scan in the main scan direction.

The detection device 8 for detecting the density a toner image formed on the photoconductive drum 5 is arranged near the surface thereof. The detection signal outputted therefrom is inputted to the control circuit 70 and the same sets a correction characteristic for the γ-characteristic of the copy machine based upon the detection signal.

Referring to FIG. 2, the photoconductive drum 5 is irradiated by an eraser lamp 42 at every copying operation before the exposure by the laser beam, charged by an electrifying charger 43 and irradiated by a sub-eraser lamp 44. When the photoconductive drum 5 is scanned by the laser beam in a state electrified uniformly, an electrostatic latent image is formed thereon. The latent image thus formed is developed using either one of developing units 45a to 45d containing yellow, magenta, cyan and black toners, respectively. The developed image is transferred to a copy paper wound around a transfer drum 51 by a transfer charger 46.

The above printing process is repeated in each of yellow, magenta, cyan and black colors. During the printing process, the scanner repeats the scanning action in synchronization with actions of the photoconductive drum 5 and the transfer drum 51. Thereafter, a separation clow 47 is operated to peel apart the copy paper from the transfer drum 51 and the toner image is fixed by passing through a fixing device 48. And, finally, the copy paper is discharged on a tray 49. Each copy paper is supplied from a paper cassette 50 and the top end thereof is chucked by a chucking mechanism arranged on the transfer drum 51 to prevent the copy paper from shifting.

[II] Read signal processing section 20

Figure 4:
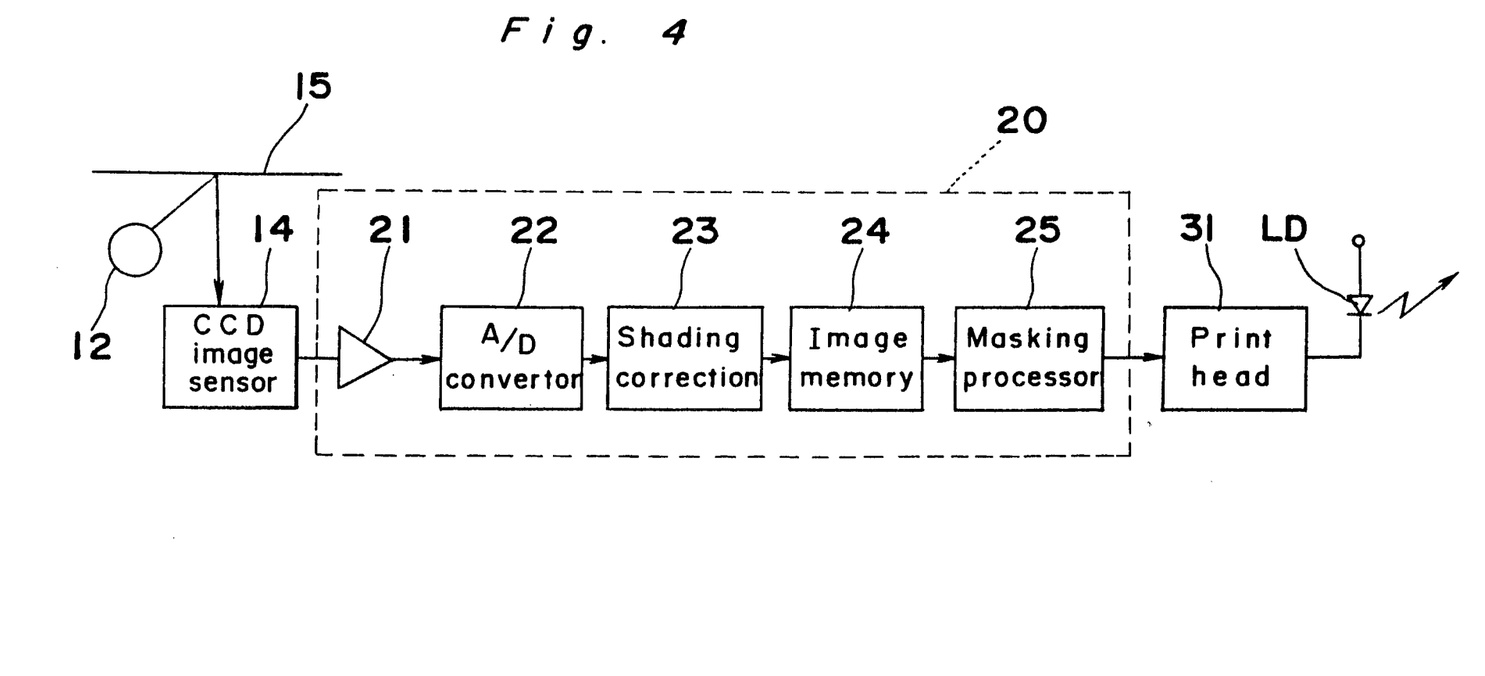
FIG. 4 is a block diagram showing a composition of the image signal processing section shown in FIG. 1.

Referring to FIG. 4, the read signal processing section 20 for outputting gradation data by processing image signals outputted from the CCD color image sensor 14 is explained.

As shown in FIG. 4, image signals obtained by the CCD color sensor 14 are converted to image densities by a log-amplifier 21 and the image density data are further converted to multi-valued digital image data of R, G and B by an analog to digital converter 22. These R, G and B image data are respectively subjected to a predetermined shading correction by a shading correction circuit 23 and, then, memorized in an image memory 24.

Next, a masking processing circuit 25 generates gradation data with respect to each color of yellow, magenta, cyan and black based upon image data of three colors R, G and B memorized in the image memory circuit 24 and outputs them to the print head 31 in order to print in each color successively.

The print head 31 performs a γ-correction corresponding to the developing property of the copy machine to the gradation data inputted, generates driving signals for the laser diode LD by performing a digital to analog conversion with respect to the corrected image data and drives the laser diode LD in response to the converted signals.

The sequential processings from reading the image data from the image memory 24 to printing by driving the laser diode LD are done with respect to each color in the order of yellow, magenta, cyan and black and, thereby, a full color image is printed on a copy paper.

In order to synchronize the image reading by the CCD color image sensor 14 with the image data processing by the signal processor 20 and the image data processing by the signal processor 20 and the print head 31 in the horizontal direction, horizontal synchronization signals and clock signals are used as well known to those skilled in the art. The image data of R, G and B from the CCD color sensor 14 are processed serially in synchronization with the clock signals and lines in a direction of the main scan are renewed every time when the horizontal synchronization signal is generated. The scanner 10 moves by a unit distance in the sub-scan direction upon renewal of the print line.

[III] Compositions of Print head 31, Control circuit 70 and Toner density detection device 8

FIG. 1 shows the print head 31, control circuit 70 and toner density detection device 8.

The gradation data of 8 bits outputted from the masking circuit 25 of the read image signal processing circuit 20 are inputted, via an interface circuit 61 for executing interface processings such as signal conversion processing and the like, to a first-in-first-out memory 62 (hereinafter referred to as FIFO memory). The FIFO memory 62 is a line buffer memory capable of memorizing gradation data of an image of a predetermined number of lines in the main scan direction and is provided because frequencies of clock signals for acting the image reader 100 and the print head 31 are different from each other.

A data switching circuit 67 is provided for switching the gradation data of 8 bits inputted from the FIFO memory 62 and gradation data of 8 bits inputted from the CPU 71 (hereinafter, referred to as test data) responsive to a switching signal $\overline{TESTEN}$ inputted from the CPU 71 selectively to output either of two gradation data (hereinafter referred to as gradation data AVIDEO) to a γ-correction circuit 63. The data switching circuit 67 outputs the gradation data inputted from the FIFO memory 62 when the switching signal $\overline{TESTEN}$ of "high" level is inputted and, when that of "low" level is inputted, it outputs the test data as the gradation data AVIDEO.

The γ-correction circuit 63 includes a γ-correction table comprised of a ROM which stores data regarding thirty two correction curves for correcting the γ-characteristic being a characteristic of the toner density of a printed image to the gradation degree so as to be linear. This correction circuit 63 converts the gradation data AVIDEO of 8 bits outputted from the data switching circuit 67 to gradation data IDATA of 10 bits according to data of the γ-correction curve selected in response to the correction data inputted from the CPU 71 and outputs the gradation data IDATA, via a digital to analog conversion circuit 64, to a gain switching circuit 65. Since the number of bits of the gradation data AVIDEO outputted from the γ-correction circuit 63 is ten while that of the gradation data IDATA inputted from γ-correction circuit 63 is eight, the corrected gradation data IDATA can represent the gradation with a precision of four times as high as that of the gradation data AVIDEO.

Figure 7B:
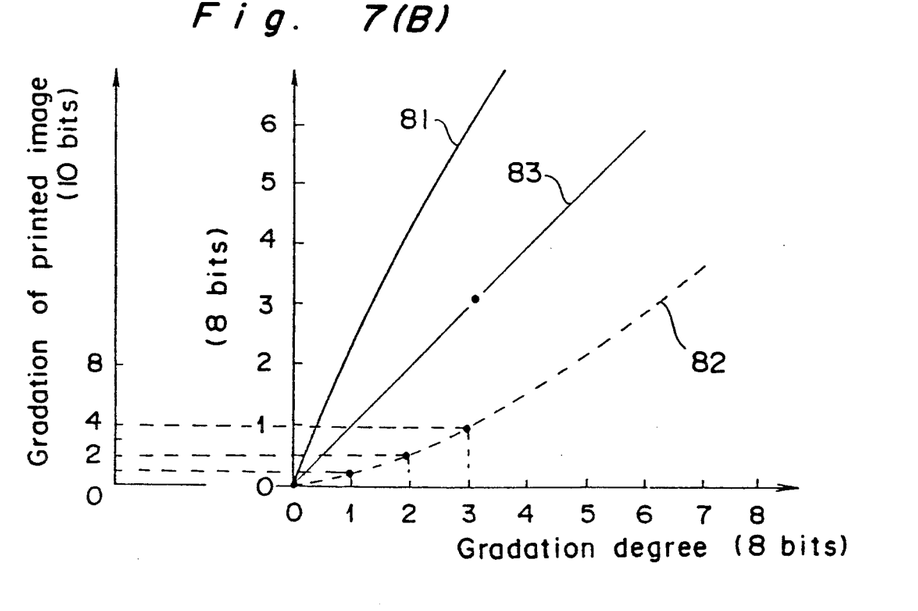

FIG. 7(B) is a graph for showing gradation characteristics shown in FIG. 7(C) in a low gradation range with an enlarged scale. Since the bit number of the corrected gradation data is eight similarly to that of the gradation data to be corrected in the conventional γ-correction circuit 63, gradation data having a gradation degree of one or two is corrected to that having a gradation degree of zero according to the correction characteristic 82 and, when the gradation degree of the gradation data to be corrected is three, an output gradation degree is set at one. Thus, errors in the correction of the gradation data become large in the conventional γ-correction circuit. To the contrary, the bit number is increased from eight to ten in the present invention and, therefore, the gradation data having a gradation degree of one or two is corrected to that having the same gradation degree according to the correction curve 83. Accordingly, errors upon the correction can be reduced reasonably in the low gradation range according to the present invention.

Figure 5:
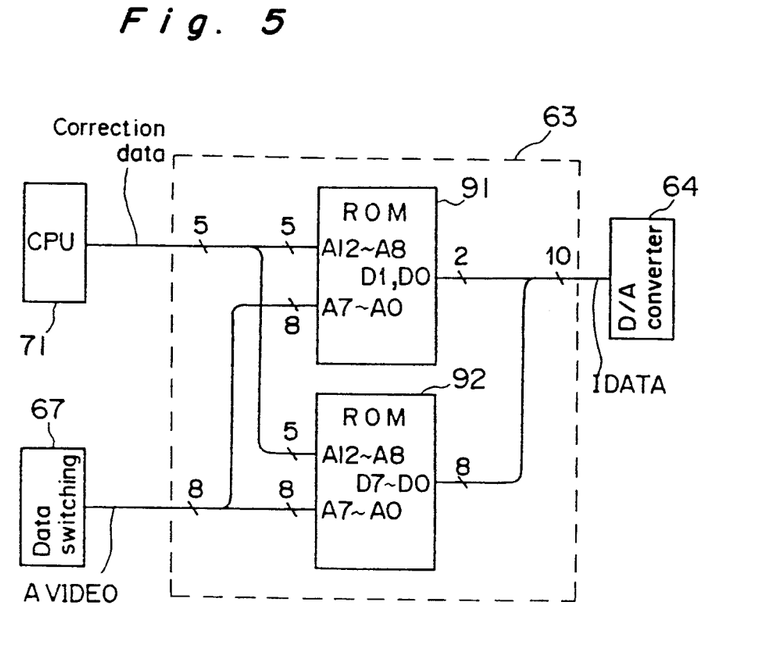
FIG. 5 is a block diagram showing a composition of the γ-correction circuit shown in FIG. 1.

FIG. 5 shows a concrete composition of the γ-correction circuit 63 which provides two ROMs 91 and 92 having a volume of 64k bites, respectively. A correction data of 5 bits inputted from the CPU 71 is inputted to address terminals A12 to A8 of each ROM 91 or 92 as an address data of upper 5 bits for selecting a correction curve and a gradation switching circuit 67 is inputted to address terminals A7 to A0 of each ROM 91 or 92 as an address data of lower 8 bits for indicating an input gradation degree. When the correction data and the gradation data AVIDEO are inputted to the ROMs 91 or 92, respectively, a gradation data IDATA of 10 bits memorized at an address designated by them is outputted, via the digital to analog conversion circuit 64, to the gain switching circuit 65.

In the gain switching circuit 65, an analog gradation signal inputted from the D/A conversion circuit 64 is inputted to a connection point P1 via an amplifier A1 and, then, outputted, via a switch SW1 and a connection point P3, to a laser diode control circuit 64 as a driving signal. A divisional potential of the analog gradation signal divided by resistances R1 and R2 is outputted, via a switch SW2 and the connection point P3, to the laser diode control circuit 66 as a driving signal. The switches SW1 and SW2 are switched in response to switching signals GS1 and GS2 generated by a switching signal generation circuit 73 according to count data set by the CPU 71. The switching signal GS2 is an inversion signal of GS1. When the switching signal GS1 is in "high" level and the switching signal GS2 is in "low" level, the switch SW1 is switched on the switch SW2 is switched off. In this state, the analog gradation signal inputted from the D/A conversion circuit 64 is outputted, via the switch SW1, to the laser diode control circuit 66 after amplified by the amplifier A1. To the contrary, when the switching signals GS1 and GS2 are inverted, respectively, the switch SW1 is switched off and the switch SW2 is switched on. In this state, the analog gradation signal is divided with an attenuation factor $L(=R2/(R1+R2))$ and, then, outputted to the laser diode control circuit 66 via the switch SW2. Accordingly, the gain switching circuit 65 switches whether the analog gradation signal is to be outputted as it is or after dividing the potential thereof by the attenuation factor according to the switching signals GS1 and GS2. Due to this switching, the γ-characteristic being an output characteristic of the gradation to be printed according to the electrophotographic method is varied.

In the laser diode control circuit 66, the driving signal LDP inputted from the gain switching circuit 65 is inputted to a first input terminal I1 of the amplifier A2 and the laser diode LD in the semiconductor laser 1 is driven by the driving signal LDP amplified. A photodiode PD is provided in the semiconductor laser 1 to monitor the output of the laser diode LD. The output of the photodiode PD is inputted, via an amplifier A3, to a second input terminal I2 of the amplifier A2 as a feedback signal MON and, thereby, a feedback control system is constituted to control the laser diode LD so as for the driving signal LDP to become equal to the feedback signal MON.

The toner amount detection device 8 for detecting the density of a toner image formed on the photoconductive drum 5 provides a light emitting device LED, a photodiode PDD and an amplifier A4, as shown in FIG. 1. This device 8 is started to operate when test images are formed on the photoconductive drum 5 according to test data outputted from the CPU 71. A light emitted from the light emitting diode LED in the device 8 is reflected from respective test images and inputted to the photodiode PDD. A detection signal of the photodiode PDD is amplified by the amplifier A4 and, then, inputted, via an analog to digital conversion circuit 72 of the control circuit 70, to the CPU 71. The signal level of the detection signal from the photodiode PDD is inversely proportional to the toner density of each test image formed on the photoconductive drum 5. The CPU 71 calculates the toner density of each test image according to the detection signal inputted and estimates the γ-characteristic of the copy machine based upon the toner density of each test image calculated. Further, it outputs the correction data for indicating to select one correction curve among those stored in the γ-characteristic estimated.

[IV] Setting for correction characteristic

As stated above, it becomes possible to enhance the faithfulness of the gradation by making the output bit number increase larger than the input bit number. However, there is such a possibility that the γ-characteristic of the copy machine is varied by changes in the environment of use such as temperature, humidity and the like. In order to solve this problem, the best correction characteristic is set according to the present preferred embodiment.

Figure 10:
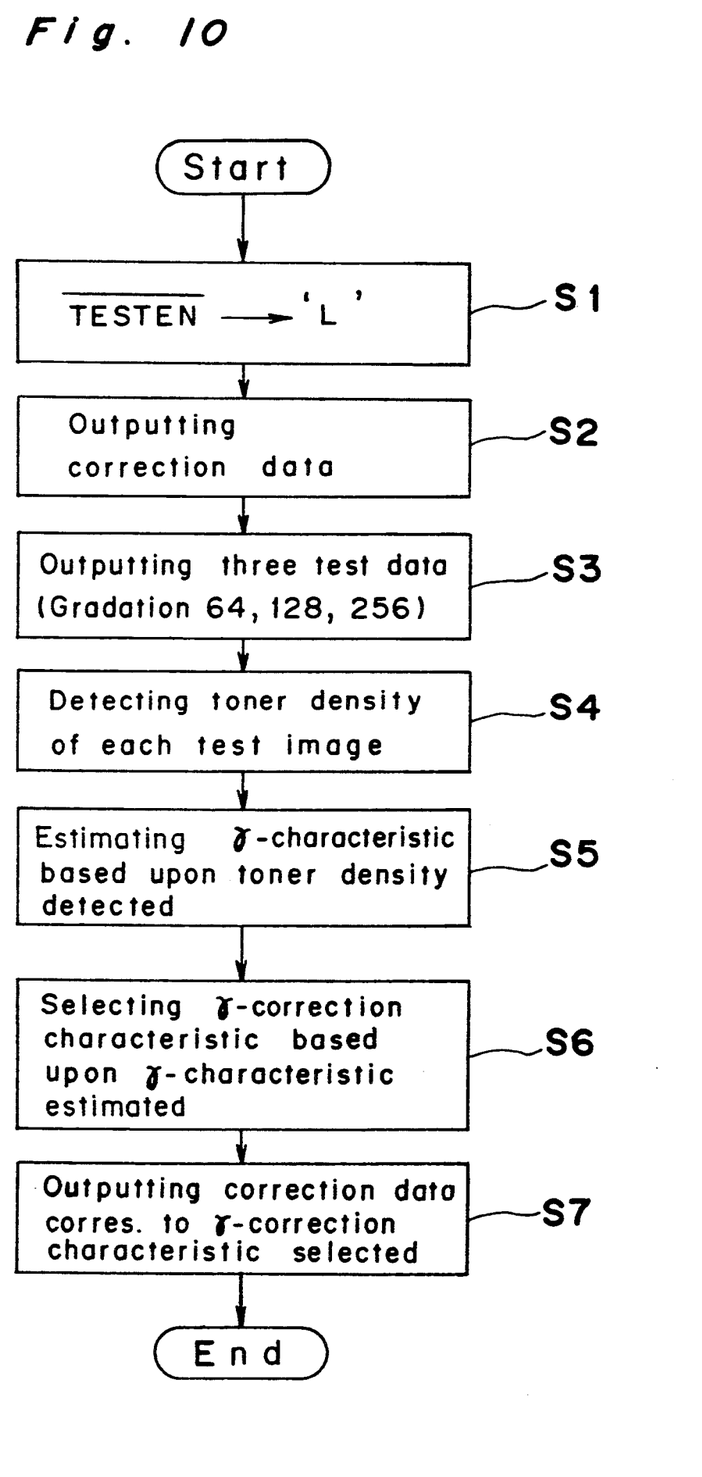
FIG. 10 is a flowchart of a control routine for obtaining the best correction characteristic from three test images having different gradations.

FIG. 10 shows a flow-chart of a control routine for setting the best correction characteristic.

The CPU 71 outputs a switching signal $\overline{\text{TESTEN}}$ of "low" level to the data switching circuit 67 in step S1 and, then, outputs a correction data for indicating selection of a set of data regarding the correction curve to the γ-correction circuit 63 in step S2.

Figure 11:
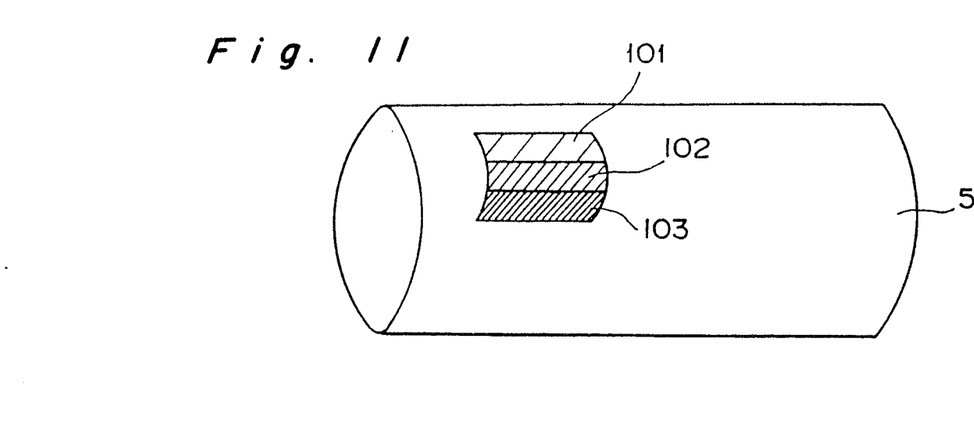
FIG. 11 is a perspective view for showing three test images formed on a photoconductive drum.

Thereafter, the CPU 71 outputs three test data having numbers of gradation degrees of 64, 128 and 255 at predetermined timings successively to the data switching circuit 67 in step S3. The laser diode driver 66 drives the laser diode LD responsive to driving signals generated according to the test data to form test images 101, 102 and 103 on the photoconductive drum 5 by developing latent images formed by the laser diode 66. In step S4, the toner density of each test image 101, 102 or 103 is detected by the toner amount detection device 8. The detection signals including the detected toner densities are inputted, via the analog to digital converter 72 of the control circuit 70, to the CPU 71. The CPU 71 calculates toner densities of respective test images 101, 102 and 103 corresponding to the detection signals and estimates an actual γ-characteristic of the copy machine. The γ-characteristic estimated is assumed to be a characteristic as indicated by 81b in FIG. 8.

Figure 8:
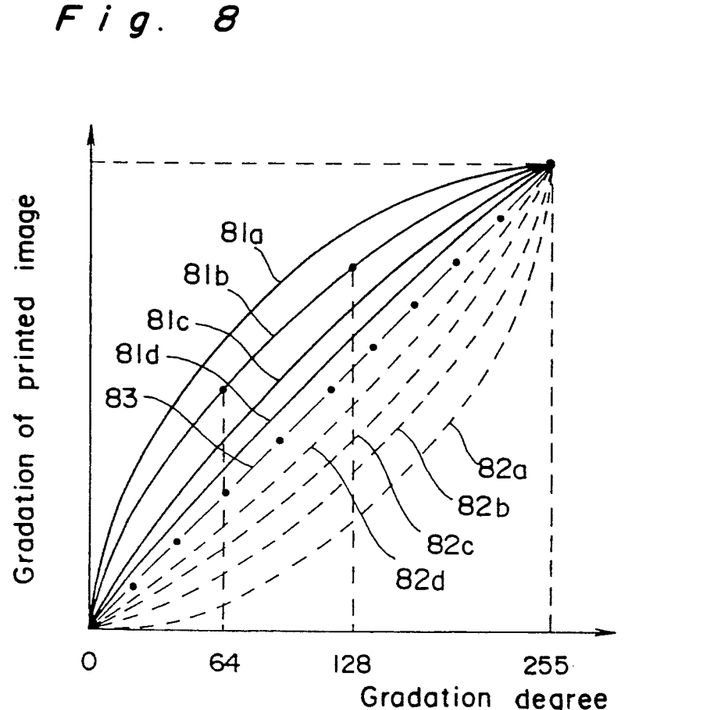
FIG. 8 is a graph showing plural γ-characteristics and correction characteristics corresponding to them, respectively.

Further, the CPU 71 selects a correction characteristic 82b corresponding to the γ-characteristic 81b estimated beforehand in step S6 and outputs a correction data for indicating selection of the correction characteristic 82b to the γ-correction circuit 63 in step S7 and, thereby, finishes the control routine.

Due to this control routine, it becomes possible to set the best correction characteristic corresponding to the actual γ-characteristic of the copy machine even if the environment of use such as temperature, humidity and the like is varied.

Figure 6:
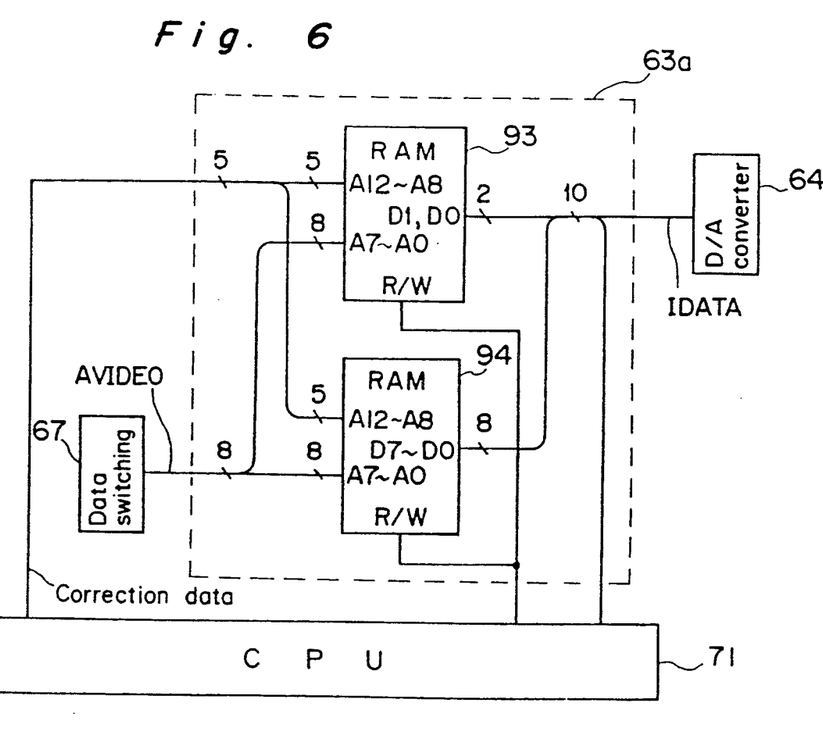
FIG. 6 is a block diagram showing a variation of the γ-correction circuit.

FIG. 6 is a block diagram showing a variation 63a of the γ-correction circuit 63. The γ-correction circuit 63a provides two RAMs 93 and 94 having a memory of 64k bites, respectively, which enable to rewrite data of the correction characteristic tables from the side of the CPU 71. Namely, the CPU 71 performs control regarding reading and writing data in the RAMs 93 and 94 and data to be written are inputted to data terminals D7 to D0 of the RAM 94 and those D1 and D0 of the RAM 93 by the CPU 71.

Figure 9:
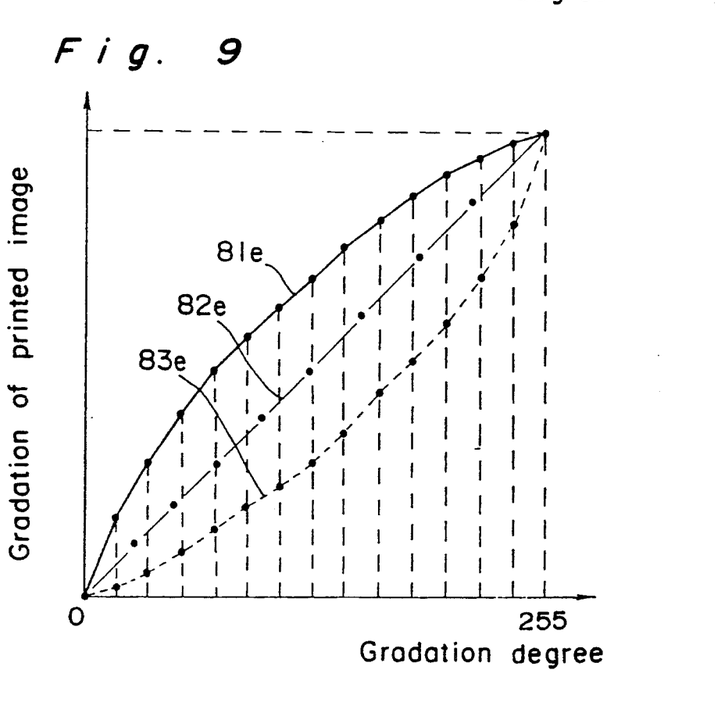
FIG. 9 is a graph showing a γ-characteristic and a correction characteristic therefor approximated with kinked lines.

It is desirable to form test images as many as possible, for example 14 test images as shown in FIG. 9, to estimate the γ-characteristic particularly, as shown by a γ-characteristic 81e in FIG. 9. In this case, the γ-characteristic is approximated by using kinked links and data regarding the correction characteristic 83e corresponding thereto are written into the RAMs 93 and 94 of the γ-correction circuit 63a. This enhances the precision of correction to the γ-characteristic.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An image forming apparatus for forming an image on a recording medium by projecting a laser beam thereon including the following;
  a reader means for reading a document image and outputting first image data, said first image data being digital data each of which is comprised of bits of a first number and representing a density of said document image with a plurality of gradation degrees,
  a correction means for correcting a gradation characteristic of said first image data and outputting second image data, said second image data being digital data each of which is comprised of bits of a second number and representing the density of said document image with a plurality of gradation degrees and said second number being larger than said first number, a digital to analog conversion means for converting said second image data to analog data and outputting them as third image data, and a driving means for supplying an energizing electric current to a laser emitting device responsive to said third image data.

2. The image forming apparatus as claimed in claim 1, in which said image reading means has a photo-electric conversion device for outputting analog image signals according to the density of said document image and an analog to digital conversion means for converting said analog image signals to digital data to output said first image data.

3. The image forming apparatus as claimed in claim 1, in which said correction means has a memory means which memorizes at least one correction table for converting first data each being comprised of bits of said first number to second data each being comprised of bits of said second number.

4. The image forming apparatus as claimed in claim 3, in which said memory means is a ROM.

5. The image forming apparatus as claimed in claim 3, in which said memory means is a RAM.

6. The image forming apparatus as claimed in claim 3, in which said memory means has a plurality of correction tables and said correction means converts said first data to said second data using either one of said correction tables memorized in said memory means.

7. The image forming apparatus as claimed in claim 6 further including a test means for forming test images having gradation degrees different from each other, a detection means for detecting densities of said plural test images and a selection means for selecting one correction table among said plural correction tables responsive to a result of detection by said detection means.

8. The image forming apparatus as claimed in claim 7, in which said test means has a data supply means for supplying plural test data having gradation degrees different from each other to said correction means and a control means for controlling said correction means so as to output said second image data after correcting said test data using a predetermined correction table.

9. A laser recording apparatus including a photoconductive body, a laser emitting device for forming an electrostatic latent image by projecting a laser beam on said photoconductive body, a developing means for developing said latent image on said photoconductive body with toner, a reading means for reading a document image and outputting first image data, said first image data being digital data each of which is comprised of bits of a first number and representing a density of said document image by plural gradation degrees, a correction means for correcting said first image data to output second image data, said second image data being digital data each of which is comprised of bits of a second number and representing the density of said document image with plural gradation degrees, said second number being larger than said first number whereby said second image data are corrected so as to have a relationship in which a density of an image developed on said photoconductive body is proportional to that of said document image, a digital to analog conversion means for converting said second image data to analog data to output them as third image data and a driving means for supplying an energizing current to said laser emitting device responsive to said third image data.

10. The laser recording apparatus as claimed in claim 9, in which said reading means has a photoelectric conversion device for outputting analog image signals responsive to the density of said document image and an analog to digital conversion means for converting said analog image signals to digital signals to output said first image data.

11. The laser recording apparatus as claimed in claim 10, in which said correction means has a memory means for memorizing at least one correction table for converting first data each being comprised of bits of a first number to second data each being comprised of bits of a second number.

12. The laser recording apparatus as claimed in claim 11, in which said memory means is a ROM.

13. The laser recording apparatus as claimed in claim 11, in which said memory means is a RAM.

14. The laser recording apparatus as claimed in claim 11, in which said memory means has a plurality of correction tables and said correction means converts said first data to said second data using either one of said correction table memorized in said memory means.

15. The laser recording apparatus as claimed in claim 14 further including a test means for forming test images having gradation degrees different from each other, a detection means for detecting respective densities of said plural test images and a selection means for selecting one correction table among said plural correction tables memorized in said memory means according to a result of detection by said detection means.

16. The laser recording apparatus as claimed in claim 15, in which said test means has a data supply means for supplying test data having gradations degrees different from each other to said correction means and a control means for controlling said correction means so as to output said second image data after correcting said test data using a predetermined correction table.

17. An image forming method to be used in an image forming apparatus for forming an image by projecting a laser beam on a recording medium including the following steps;

reading a document image to output first image data, said first image data being digital data each being comprised of bits of a first number and representing a density of said document image with plural gradation degrees, correcting the gradation characteristic of said first image data to output second image data, said second image data being digital data each being comprised of bits of a second number and representing the density of said document image with plural gradation degrees and said second number being larger than said first one, converting said second image data to analog data to output third image data and supplying an energizing current to a laser emitting device responsive to said third image data.

* * * * *